(12) United States Patent
Barinov

(10) Patent No.: US 10,382,625 B2
(45) Date of Patent: Aug. 13, 2019

(54) SCALABLE APPROACH TO AGENT-GROUP STATE MAINTENANCE IN A CONTACT CENTER

(71) Applicant: GENESYS TELECOMMUNICATIONS LABORATORIES, INC., Daly City, CA (US)

(72) Inventor: Vitaly Y. Barinov, Clayton, CA (US)

( * ) Notice: Subject to any disclaimer, the term of this patent is extended or adjusted under 35 U.S.C. 154(b) by 0 days.

(21) Appl. No.: 15/896,012

(22) Filed: Feb. 13, 2018

(65) Prior Publication Data

US 2018/0176375 A1   Jun. 21, 2018

Related U.S. Application Data

(63) Continuation of application No. 13/672,572, filed on Nov. 8, 2012, now Pat. No. 9,900,432.

(51) Int. Cl.
H04M 3/51 (2006.01)

(52) U.S. Cl.
CPC ........ *H04M 3/51* (2013.01); *H04M 2203/402* (2013.01); *H04M 2203/558* (2013.01)

(58) Field of Classification Search
CPC ............. H04M 3/51; H04M 2203/402; H04M 2203/558
See application file for complete search history.

(56) References Cited

U.S. PATENT DOCUMENTS

| | | | |
|---|---|---|---|
| 5,937,051 A | 8/1999 | Hurd et al. | |
| 6,021,428 A | 2/2000 | Miloslavsky | |
| 6,055,308 A | 4/2000 | Miloslavsky et al. | |
| 6,134,315 A | 10/2000 | Galvin | |
| 6,377,567 B1 | 4/2002 | Leonard | |
| 6,393,472 B1 | 5/2002 | Anerousis et al. | |
| 6,404,883 B1 | 6/2002 | Hartmeier | |
| 6,625,139 B2 | 9/2003 | Miloslavsky et al. | |
| 6,650,748 B1 | 11/2003 | Edwards et al. | |
| 6,834,303 B1 | 12/2004 | Garg et al. | |
| 6,868,152 B2 | 3/2005 | Statham et al. | |
| 6,879,586 B2 | 4/2005 | Miloslavsky et al. | |
| 6,985,943 B2 | 1/2006 | Deryugin et al. | |
| 7,376,227 B2 | 5/2008 | Anisimov et al. | |
| 7,490,145 B2 | 2/2009 | Sylor et al. | |
| 7,526,540 B2 | 4/2009 | Gopisetty et al. | |
| 7,602,725 B2 | 10/2009 | Vaught | |
| 7,701,925 B1 | 4/2010 | Mason et al. | |

(Continued)

FOREIGN PATENT DOCUMENTS

EP   2306381 A1   4/2011

OTHER PUBLICATIONS

Tanenbaum, Andrew S., Computer Networks, Fourth Edition, 2003, Prentice Hall PTR, 4 pages.

(Continued)

*Primary Examiner* — Viet D Vu

(57) ABSTRACT

A system and method for aggregating state information in a contact center. Agent-owner nodes aggregate state information for the agents they own, and, upon request from a client-side adapter, provide partial agent-group state information to the client side adapter. The client-side adapter aggregates the partial agent-group state information to form full agent-group state information and provides this full agent-group state information to clients upon request.

20 Claims, 5 Drawing Sheets

(56) References Cited

U.S. PATENT DOCUMENTS

| | | | |
|---|---|---|---|
| 7,792,773 | B2 | 9/2010 | McCord et al. |
| 7,817,796 | B1 | 10/2010 | Clippinger et al. |
| 7,936,867 | B1 | 5/2011 | Hill et al. |
| 8,023,637 | B2 | 9/2011 | Irwin et al. |
| 8,031,860 | B2 | 10/2011 | Coussement |
| 8,146,000 | B1 | 3/2012 | Boliek et al. |
| 8,391,463 | B1 | 3/2013 | Kiefhaber et al. |
| 8,510,807 | B1 | 8/2013 | Elazary et al. |
| 8,588,398 | B1 | 11/2013 | Irwin et al. |
| 8,594,306 | B2 | 11/2013 | Laredo et al. |
| 8,630,399 | B2 | 1/2014 | D'Arcy et al. |
| 8,634,541 | B2 | 1/2014 | Flockhart et al. |
| 8,675,859 | B2 | 3/2014 | Mandalia et al. |
| 8,701,128 | B2 | 4/2014 | Salt et al. |
| 8,719,067 | B2 | 5/2014 | Fama et al. |
| 8,792,633 | B2 | 7/2014 | Barinov |
| 8,848,898 | B2 * | 9/2014 | Jay ............... H04M 3/5125 379/265.09 |
| 2002/0046273 | A1 | 4/2002 | Lahr et al. |
| 2002/0095462 | A1 | 7/2002 | Beck et al. |
| 2002/0110113 | A1 | 8/2002 | Wengrovitz |
| 2002/0156599 | A1 | 10/2002 | Oosthoek et al. |
| 2003/0018702 | A1 | 1/2003 | Broughton et al. |
| 2003/0115317 | A1 | 6/2003 | Hickson et al. |
| 2003/0198183 | A1 | 10/2003 | Henriques et al. |
| 2004/0028212 | A1 | 2/2004 | Lok et al. |
| 2004/0044585 | A1 | 3/2004 | Franco |
| 2004/0088315 | A1 | 5/2004 | Elder et al. |
| 2004/0252822 | A1 | 12/2004 | Statham et al. |
| 2005/0154637 | A1 | 7/2005 | Nair et al. |
| 2005/0210262 | A1 | 9/2005 | Rolia et al. |
| 2006/0159027 | A1 | 7/2006 | Owens |
| 2006/0195599 | A1 | 8/2006 | Gedik et al. |
| 2007/0226239 | A1 | 9/2007 | Johnson et al. |
| 2008/0077470 | A1 | 3/2008 | Yamanaka |
| 2008/0225804 | A1 | 9/2008 | Thubert et al. |
| 2009/0168991 | A1 | 7/2009 | Zgardovski et al. |
| 2009/0271529 | A1 | 10/2009 | Kashiyama et al. |
| 2009/0316687 | A1 | 12/2009 | Kruppa |
| 2009/0327441 | A1 | 12/2009 | Lee et al. |
| 2010/0002863 | A1 | 1/2010 | Loftus et al. |
| 2010/0020689 | A1 | 1/2010 | Tang |
| 2010/0106710 | A1 | 4/2010 | Nishizawa et al. |
| 2010/0250566 | A1 | 9/2010 | Paul |
| 2010/0293532 | A1 | 11/2010 | Andrade et al. |
| 2011/0055122 | A1 | 3/2011 | Andreoli |
| 2011/0119761 | A1 | 5/2011 | Wang et al. |
| 2011/0227754 | A1 | 9/2011 | Hill |
| 2011/0254732 | A1 | 10/2011 | Martin et al. |
| 2011/0283000 | A1 | 11/2011 | McCormack et al. |
| 2012/0079061 | A1 | 3/2012 | Krebs |
| 2012/0158995 | A1 | 6/2012 | McNamee et al. |
| 2012/0233107 | A1 | 9/2012 | Roesch et al. |
| 2012/0323997 | A1 | 12/2012 | Mezhibovsky et al. |
| 2013/0050199 | A1 | 2/2013 | Chavez |
| 2013/0121484 | A1 * | 5/2013 | Elkington ........... H04M 3/5232 379/265.05 |
| 2013/0204959 | A1 | 8/2013 | Zhang et al. |
| 2014/0126711 | A1 | 5/2014 | Barinov |
| 2014/0126713 | A1 | 5/2014 | Ristock et al. |
| 2014/0129617 | A1 | 5/2014 | Barinov |
| 2014/0143294 | A1 | 5/2014 | Vitaly |
| 2014/0143373 | A1 | 5/2014 | Vitaly |
| 2014/0294169 | A1 | 10/2014 | Barinov |

OTHER PUBLICATIONS

Abadi, Daniel, "Problems with CAP, and Yahoo's little known NoSQL system", http://dbmsmusings.blogspot.com/2010/04/problems-with-cap-and-yahoos-little.html, (4 pages).

Anisimov, Nikolay et al., XML Based Framework for Contact Center Applications; WEBIST 2007—International Conference on Web Information Systems and Technologies, 2007, 8 pages.

Arasu, A., Widom, J. "Resource Sharing in Continuous Sliding-Window Aggregates", Proceedings of the 30th VLDB Confernece, Toronto, Canada 2004, (24 pages).

Birman, Kenneth P. et al., Exploiting Virtual Synchrony in Distributed Systems, Cornell University, ACM, 1987, pp. 123-138.

Cormode, G., et al., "Brief Announcement: Tracking Distributed Aggregates over Time-based Sliding Windows", PODC'11, Jun. 6-8, 2011, San Jose, California, USA, ACM 978-1-4503-0719-2/11/06, (2 pages).

Gilbert, S., and Lynch, N., "Brewer's Conjecture and the Feasibility of Consistent, Available, Partition-Tolerant Web Services", ACM SIGACT News, vol. 33 Issue 2 (2002), 51-59 (12 pages).

Han, J. and Kamber, M. "Data Mining: Concepts and Techniques", 2nd Edition., Morgan Kaufmann Publishers, Mar. 2006, (136 pages).

Hypergraph—Wikipedia, http://en.wikipedia.org/wiki/Hypergraph, as captured on Mar. 29, 2013, 8 pages.

International Search Report and Written Opinion for PCT/US2013/071104, dated Feb. 27, 2014, 12 pages.

Karypis, G., et al., Multilevel Hypergraph Partitioning: Applications in VLSI Domain, IEEE Transactions on Very Large Scale Integration (VLSI) Systems, vol. 7, No. 1, Mar. 1999, pp. 69-79.

Lamport, Leslie, "Paxos Made Simple", ACM SIGACT News (Distributed ComputingColumn) 32, 4 (Whole No. 121, Dec. 2001), pp. 51-58 (14 pages).

Li, J et al., "No Pane, No Gain: Efficient Evaluation of Sliding-Window Aggregates over Data Streams", SIGMOD Record, vol. 34, No. 1, Mar. 2005, pp. 39-44 (6 pages).

Madden, S. et al. "TAG: a Tiny AGgregation Service for Ad-Hoc Sensor Networks", ACM SIGOPS Operating Systems Review—OSDI '02: Proceedings of the 5th symposium on Operating systems design and implementation, vol. 36 Issue SI, Winter 2002, 131-146 (16 pages).

Zoltan Developer's Guide: Quality Program; Zoltan Toolkit, http://www.cs.sandia.gov/zoltan/dev_html/dev_intro_sqe._html, as captured on Mar. 29, 2013, 6 pages.

* cited by examiner

SCALABLE APPROACH TO AGENT-GROUP STATE MAINTENANCE IN A CONTACT CENTER

CROSS-REFERENCE TO RELATED APPLICATIONS

This application is a continuation of U.S. patent application Ser. No. 13/672,572, filed on Nov. 8, 2012, now U.S. Pat. No. 9,900,432, the content of which is incorporated herein by reference.

FIELD

This disclosure generally relates to monitoring of contact center state, and pertains more particularly to monitoring the states of agent groups in a contact center.

BACKGROUND

Contact centers may be used by an organization to communicate in an efficient and systematic manner with outside parties. Such centers may for example have large numbers of agents staffing telephones, and interacting with outside parties and with each other. Calls may be placed on hold or into an interactive voice response (IVR) system when first connected to the contact center; subsequently an agent may take a call, place it back on hold, transfer the call, conference in another agent, or take other such actions related to the call. Outside parties may also interact with a contact center by other mechanisms, including initiating contact through on-line chat, video, email, and the like.

In routing incoming calls or other contacts, it may be helpful to know, for example, how many agents in the group of agents with a certain level of expertise in a given topic are available, or to obtain other information about this group of agents, such as how many contacts they participated in during a given day. A contact center monitoring system which maintains and organizes such information should be able to handle large numbers of agents and devices, without significant degradation in performance; viz. such a system should be scalable to larger installations without being limited by a performance bottleneck. In particular, a simple approach suitable for a small system, such as maintaining all of the contact center state information in a database, stored in a back-end database server, and accessed via multiple front-end clients, may be unacceptable because it may suffer from multiple hardware and software bottlenecks at the single server, the load on which may increase rapidly as the contact center increases in size.

Thus, there is a need for a scalable system for maintaining contact center state information, and, in particular, information on the states of agent groups.

SUMMARY

According to one aspect, a system and method of maintaining agent-group state information in a scalable manner is provided. Agent-owner nodes collect and aggregate agent state information, each agent-owner node collecting full agent state information for each agent it owns. A client-side adapter assembles agent-group state information by querying the agent-owner nodes to obtain from them state information for each agent in the agent group.

According to an embodiment of the present invention there is provided a system, including: a first server, including one or more processors and a first memory, wherein the first memory stores instructions that, when executed by the first server, cause the first server to instantiate: a plurality of agent-owner nodes, each agent-owner node of the plurality of agent-owner nodes being configured to own one or more agents; and to maintain state information for each agent owned by the agent-owner node; and a second server, including one or more processors and a second memory, wherein the second memory stores instructions that, when executed by the second server, cause the second server to instantiate: a client-side adapter, configured to obtain partial agent-group state information from each agent-owner node of the plurality of agent-owner nodes, and to aggregate the partial agent-group state information to form aggregated agent-group state information.

In one embodiment, the aggregated agent-group state information is full agent-group state information.

In one embodiment, the aggregated agent-group state information is partially aggregated agent-group state information.

In one embodiment, the first memory further stores instructions that, when executed by the first server, cause the first server to instantiate a plurality of linking nodes configured: to obtain agent state information from one or more data sources or from one or more other linking nodes, and to communicate agent state information to one or more agent-owner nodes of the plurality of agent-owner nodes.

In one embodiment, the agent-owner nodes are configured to own mutually exclusive sets of agents.

In one embodiment, the first server and the second server are not the same server.

In one embodiment, the first server and the second server are configured to enable communication between the client-side adapter and the agent-owner nodes over a Transmission Control Protocol and Internet Protocol (TCP/IP) connection.

In one embodiment, each agent-owner node of the plurality of agent-owner nodes is configured to receive an agent-group identifier; to determine whether each of the agents owned by the agent-owner node is a member of the agent group; and to send to the client side adapter agent-state information for each of the agents owned by the agent-owner node who is a member of the agent group.

In one embodiment, the agent-owner node is configured: to determine whether the agent is in a list of agents defining the actual agent group when the agent group is an actual agent group, and to evaluate a predicate expression corresponding to the virtual agent group with a set of characteristics for the agent when the agent group is a virtual agent group, in order to determine whether each agent owned by the agent-owner node is a member of the agent group.

In one embodiment, the predicate expression is configured to accept a set of skill level ratings corresponding to an agent's skills, and to return a value of true or false.

In one embodiment, the client-side adapter is configured to request a live connection with each agent-owner node and each agent-owner node is configured to establish a live connection with the client-side adapter.

In one embodiment, the client-side adapter is configured to purge agent state information for each agent owned by an agent-owner node when the live connection between the agent-owner node and the client-side adapter is broken.

According to an embodiment of the present invention there is provided a method, including: instantiating, by a first server, a plurality of agent-owner nodes; receiving, by each agent-owner node, agent state information from a plurality of data sources; aggregating, by each agent-owner node, the received agent state information into full agent state information; combining, by each agent-owner node, of the full agent state information corresponding to each of one or more agents in an agent group into partial agent-group state information; instantiating, by a second server, a client-side adapter; receiving, by the client-side adapter, the partial agent-group state information from each agent-owner node; and aggregating, by the client-side adapter, the partial agent-group state information into aggregated agent-group state information.

In one embodiment, the aggregated agent-group state information is full agent-group state information.

In one embodiment, the aggregated agent-group state information is partially aggregated agent-group state information.

In one embodiment, the first server and the second server are not the same server.

In one embodiment, the instantiating, by a first server, of a plurality of agent-owner nodes includes configuring each agent-owner node to own one or more agents; and the aggregating, by the agent-owner nodes, of the received agent state information into full agent state information includes aggregating, by the agent-owner nodes, of the received agent state information into full agent state information for the one or more agents owned by each agent-owner node.

In one embodiment, the configuring of each agent-owner node to own one or more agents includes configuring each agent-owner node to own one or more agents exclusively.

In one embodiment, the method further includes establishing, by the client-side adapter, a live connection with each agent-owner node; requesting, by the client-side adapter, from each agent-owner node, the partial agent-group state information; and providing, by each agent-owner node, to the client-side adapter, the partial agent-group state information.

In one embodiment, the providing, by the agent-owner nodes, to the client-side adapter, of the partial agent-group state information includes: determining, for each agent owned by each agent-owner node, whether the agent is a member of the agent group; and including, if the agent is a member of the agent group, agent state information, for the agent, in the partial agent-group state information.

In one embodiment, the determining, for each agent owned by each agent-owner node, of whether the agent is a member of the agent group, includes: determining whether the agent is in a list of agents defining the actual agent group when the agent group is an actual agent group and evaluating a predicate expression corresponding to the virtual agent group with a set of characteristics for the agent when the agent group is a virtual agent group.

In one embodiment, the method includes purging, by the client-side adapter, of state information for each agent owned by the agent-owner node, when the live connection between the client-side adapter and an agent-owner node is broken.

In one embodiment, the establishing of a live connection, by the client-side adapter, with each agent-owner node includes: connecting, by the client-side adapter, to a gateway node; requesting, by the client-side adapter, from the gateway node, a list of agent-owner nodes; and providing, by the gateway node, to the client-side adapter, a list of agent-owner nodes.

According to an embodiment of the present invention there is provided a system, including: means for instantiating a plurality of agent-owner nodes; means for receiving agent state information from a plurality of data sources; means for aggregating the received agent state information into full agent state information; means for combining the full agent state information corresponding to each of one or more agents in an agent group into partial agent-group state information; means for instantiating a client-side adapter; means for receiving the partial agent-group state information from each agent-owner node; and means for aggregating the partial agent-group state information into full agent-group state information.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a scalable approach to agent-group state maintenance in a contact center provided in accordance with the present invention and is not intended to represent the only forms in which the present invention may be constructed or utilized. The description sets forth the features of the present invention in connection with the illustrated exemplary embodiments. It is to be understood, however, that the same or equivalent functions and structures may be accomplished by different exemplary embodiments that are also intended to be encompassed within the spirit and scope of the invention. As denoted elsewhere herein, like element numbers are intended to indicate like elements or features.

Figure 1:
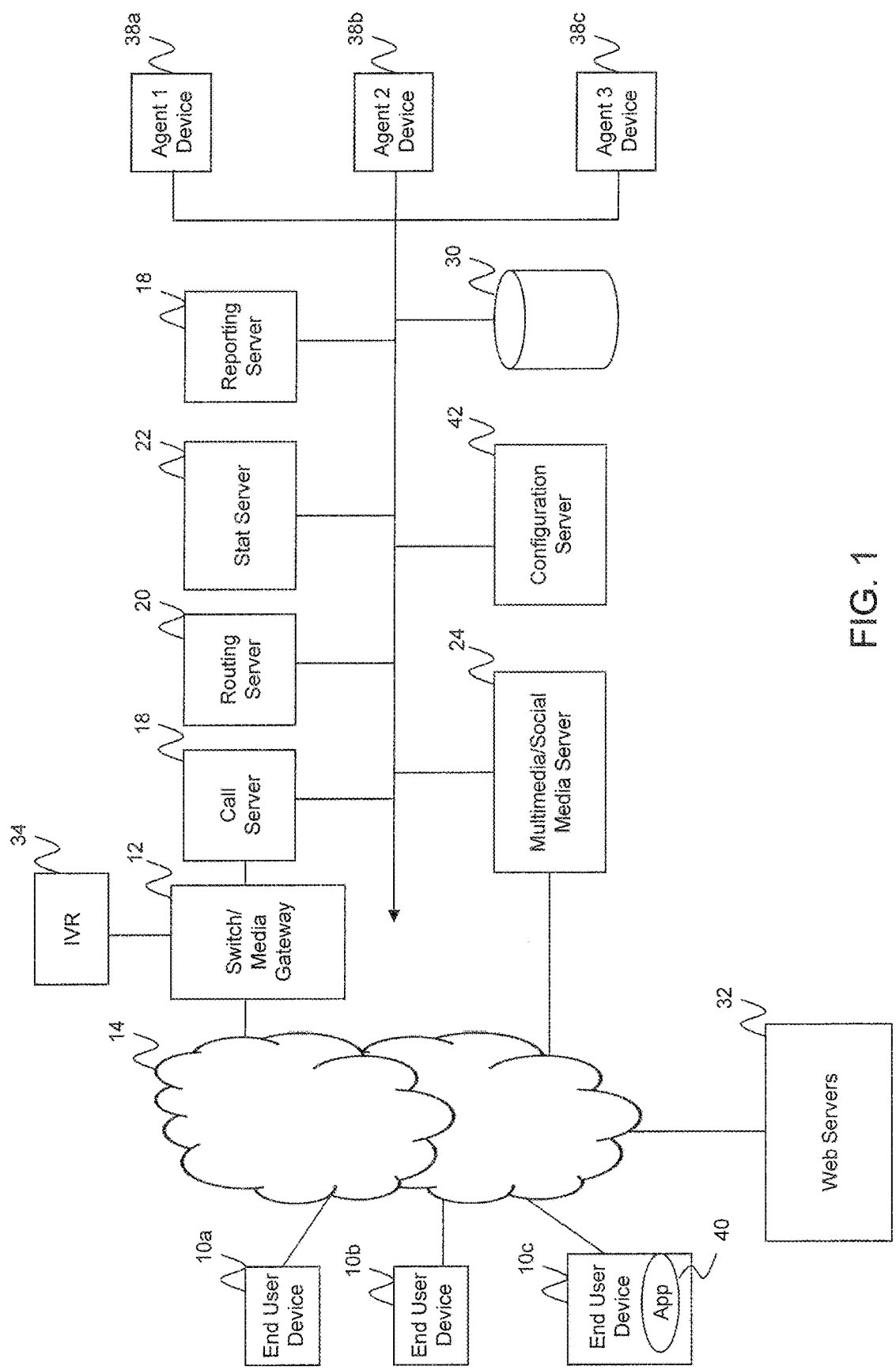
FIG. 1 is a block diagram of elements in an exemplary contact center according to an exemplary embodiment of the present invention.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms.

Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. The mechanisms of contact in a call, and the corresponding user devices 10, need not be limited to real-time voice communications as in a traditional telephone call, but may be non-voice communications including text, video, and the like, and may include email or other non-real-time means of communication. Thus the term "call" as used herein is not limited to a traditional telephone call but is a generalized term including any form of communication in which a contact center may participate.

Inbound and outbound calls from and to the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls and/or data between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch/media gateway 12 and the remainder of the routing, monitoring, and other call-handling systems of the contact center.

The contact center may also include a multimedia/social media server 24, which may also be referred to as an interaction server, for engaging in media interactions other than voice interactions with the end user devices 10 and/or web servers 32. The media interactions may be related, for example, to email, chat, text-messaging, web, social media, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls. In another exemplary embodiment, the call server may include a telephony server (T-server).

In one example, while an agent is being located and until such agent becomes available, the call server may place the call in a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to the corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations. The selection of an appropriate agent for routing an inbound call may be based, for example, on a routing strategy employed by the routing server 20, and further based on information about agent availability, skills, and other routing parameters provided, for example, by a statistics server 22, which may also be referred to as a stat server 22. A person of skill in the art should recognize that the stat server 22 may also be implemented via firmware (e.g. an application-specific integrated circuit), hardware, or a combination of software, firmware, and hardware.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

To store configuration information such as device characteristics and agent attributes, such as agent skill levels, a configuration server 42 may be included in the system. The configuration server 42 may, for example, provide attribute values for objects or processes when these are created, at system startup, or subsequently.

According to one exemplary embodiment of the invention, the contact center also includes a mass storage device 30 for storing data related to contact center operations such as, for example, information related to agents, customers, customer interactions, and the like. The mass storage device may take the form of a hard disk or disk array as is conventional in the art.

Each of the various servers of FIG. 1 may include one or more processors executing computer program instructions and interacting with other system components for performing the various functionalities described herein. The computer program instructions are stored in a memory which may be implemented in the server using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the exemplary embodiments of the present invention.

For purposes of routing calls to appropriate agents, as described above, it may be useful to define groups of agents referred to as agent groups. The members of an agent group may, for example, all have expertise or skills in a particular area. Agent groups may overlap in the sense that a given agent may be a member of more than one group. Two types of agent groups may be defined: actual agent groups, and virtual agent groups. Actual agent groups may for example be defined by a list created in advance by a contact center supervisor. To determine whether an agent is a member of an actual agent group, the system consults the list corresponding to that agent group to check whether the agent is on the list. A virtual agent group may instead by defined by a predicate expression, e.g., an expression which evaluates to true or false when supplied with an agent's skill characteristics.

Each agent may have a skill level rating in each of a set of skills, such as the ability to speak a particular language, or familiarity with a particular product. Then, for example, the virtual group of fluent Spanish speakers may be defined as the set of agents for which the value of a Spanish skill level attribute exceeds a threshold value for fluency. Each agent group may be identified by any suitable unique identifier referred to as the agent-group identifier, which may be set by the system administrator, and which may be a unique string value. Each agent may also have a unique identifier, referred to as the agent identification number.

During contact center operation, each agent may have a status, i.e., a scalar which may take a value such as Ready, NotReady, OnCall, etc., corresponding to the agent being ready to accept calls, not ready to accept calls, currently in a call, or the like. The agent may also have a state $\sigma_A$, which may include her status $\mu_A$ and the state $\sigma_{DN}$ of each directory number (DN) to which she is logged in, i.e., $\sigma_A=\{[\sigma_{DN}],\mu_A\}$.

In one exemplary embodiment, a server, such as the stat server, may instantiate a set of processes referred to as agent-owner nodes, which may be numbered 1 through P. In one exemplary embodiment, each agent is owned by exactly one agent-owner node which is exclusively responsible for maintaining state information for the agent. Any agent-owner node may own several agents and the set of agents owned by the $i^{th}$ agent-owner node $N_i$ may be referred to as $\Lambda_i$. In one exemplary embodiment, efficient mapping of each agent to the corresponding agent-owner node may be accomplished, for example, with a static hash function: $H:O \rightarrow N_i$. The set of all agents $\Lambda_{all}$ is the union, over all of the agent-owner nodes, of the sets $\Lambda_i$:

$$\Lambda_{all} = \bigcup_{i=1}^{P} \Lambda_i$$

Figure 2:
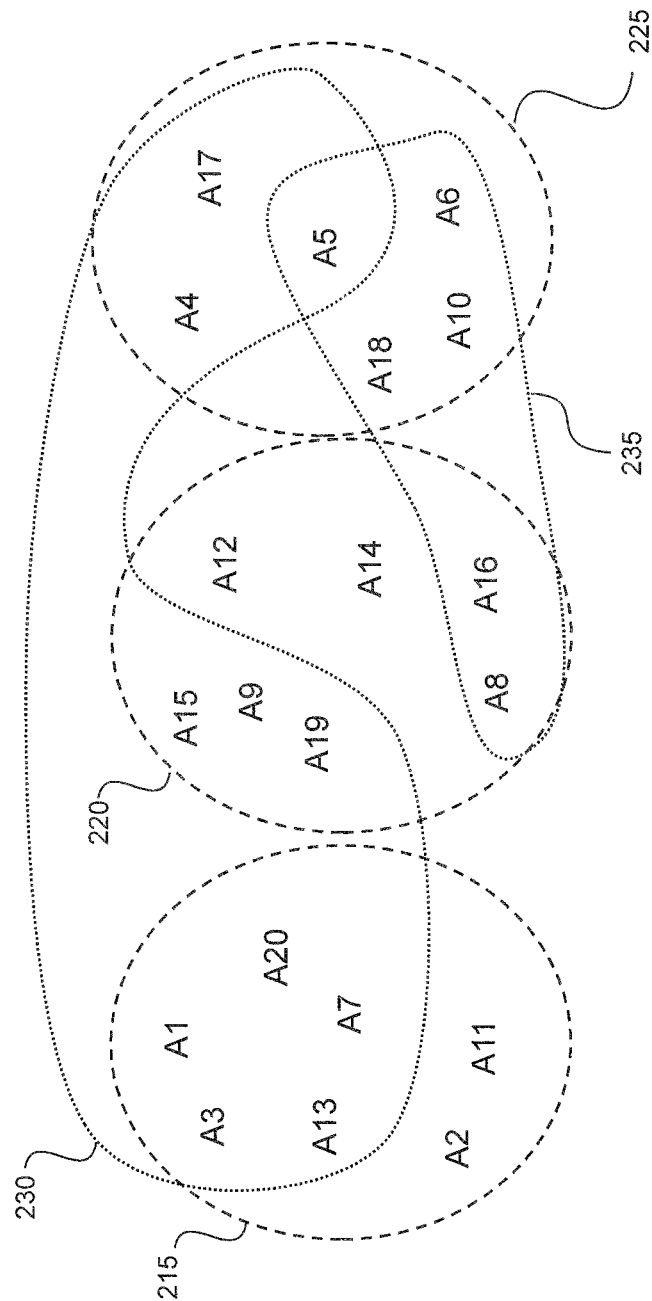
FIG. 2 is a Venn diagram illustrating the relationship between the set of all agents, the sets of agents owned by several agent-owner nodes, and the set of agents in each of two groups, according to an exemplary embodiment of the present invention.

For example, referring to FIG. 2, the agents A1 through A20 may be owned by three agent-owner nodes, with the set 215 being the set of agents owned by agent-owner node 1 (i.e., $\Lambda_1$) including agents A1, A2, A3, A7, A11, A13, and A20, with the set 220 being the set of agents owned by agent-owner node 2 and with the set 225 being the set of agents owned by agent-owner node 3. Each agent group may include agents owned by one or more different agent-owner nodes, so that, for example, a first agent group 230 may include agents from all three sets 215, 220 and, 225, and a second agent group 235 may include agents from the sets 220 and 225.

Each agent-owner node may have the ability to determine whether an agent it owns is a member of a particular agent group. If the agent group is an explicit agent group then at startup the node may receive a membership list for each agent group from the configuration server, so that it may, for each agent it owns, determine whether the agent is on a given membership list and therefore a member of the corresponding agent group. In the case of a virtual agent group, the agent-owner node may evaluate the corresponding predicate expression for the characteristics (e.g., skill level set) of an agent it owns, to determine whether the agent is a member of the corresponding group.

Figure 3:
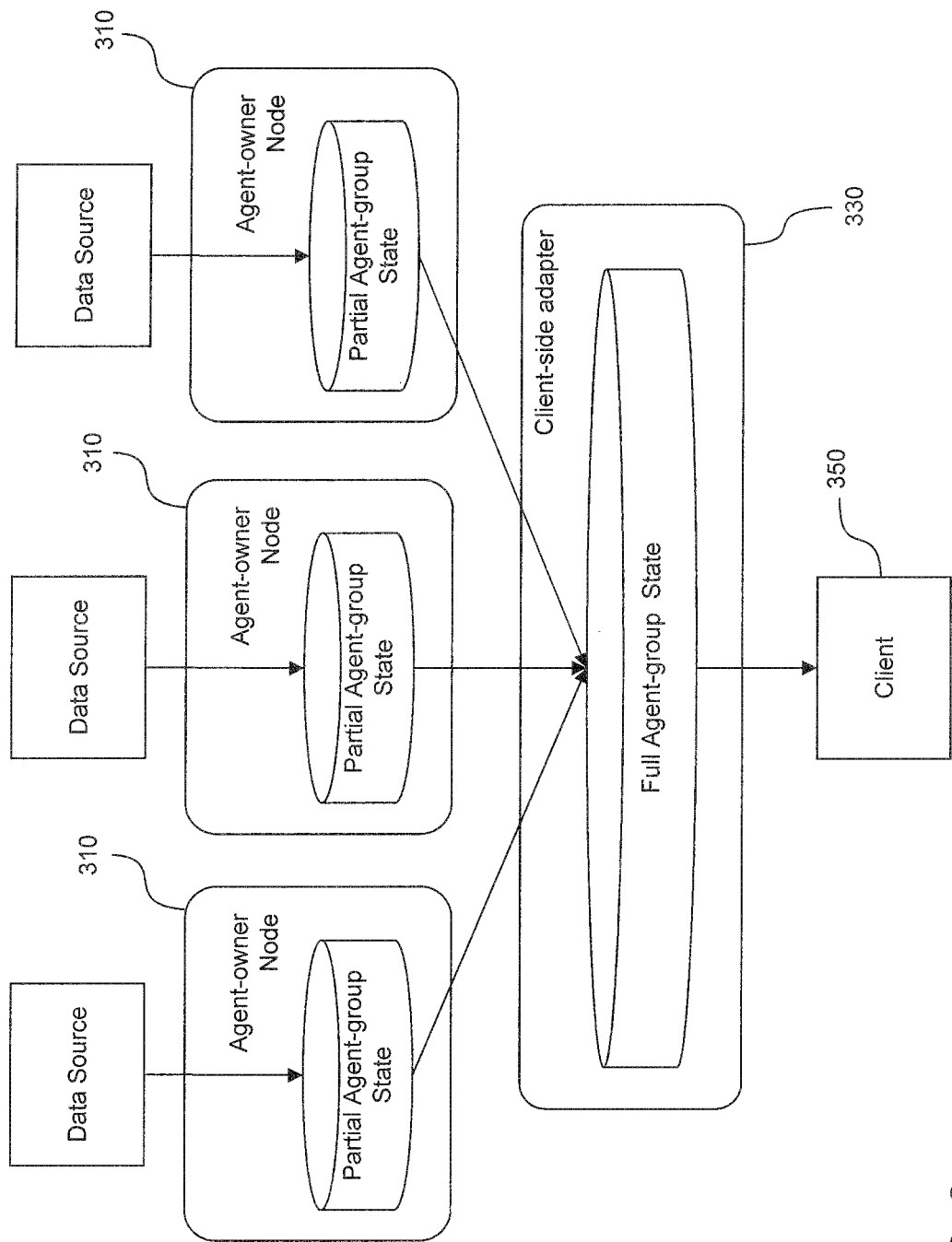
FIG. 3 is a data-flow diagram illustrating data paths for agent state information according to an exemplary embodiment of the present invention.

Referring to FIG. 3, each agent-owner node 310 may be connected to various data sources, from each which it may obtain, and aggregate, partial agent state information, to form full agent state information for each agent it owns. These data sources may include device controllers and call controllers running in the call server 18 (FIG. 1) and providing updates on the states of DNs in the contact center and on the states of calls in progress. The agent-owner node 310 may also obtain partial agent state information from other agent-owner nodes 310, and other nodes that are not agent-owner nodes 310 but may instead be DN-owner nodes or nodes that own neither DNs nor agents.

Figure 4:
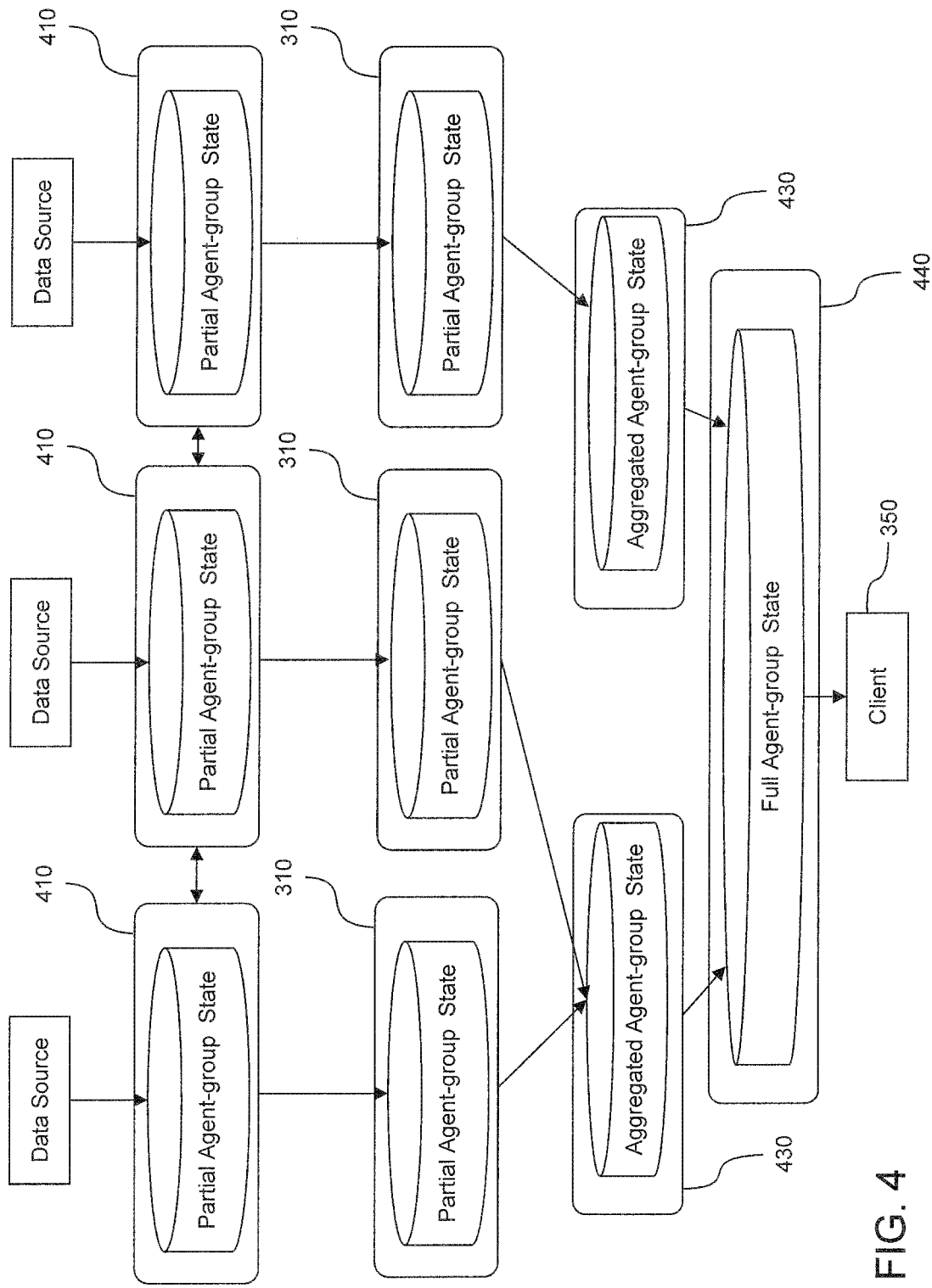
FIG. 4 is a data-flow diagram illustrating data paths for agent state information according to another exemplary embodiment of the present invention.

Referring to FIG. 4, such other nodes, which provide direct or indirect links between data sources and agent-owner nodes may be referred to as linking nodes 410. In one exemplary embodiment, the agent-owner nodes 310 and other nodes including the linking nodes 410 may be connected by a publish-subscribe bus, which may be employed to communicate state information between the nodes. The linking nodes 410 may perform both the function of communicating state information from data sources to agent-owner nodes 310 and of aggregating agent state information.

Referring again to FIG. 3, in one exemplary embodiment, the agent-owner nodes may execute in the stat server, which may be a multi-processor server including shared memory, and communications between nodes may take place using the shared memory. Each agent-owner node 310 may be a multi-threaded process, and, depending on the operating system employed, may execute on one processor or on multiple processors, and the processors on which a particular agent-owner node 310 executes may change dynamically at run time as threads are created and destroyed. In another exemplary embodiment, the agent-owner nodes 310 may run on separate processors in separate machines.

The state of an agent group G may be formed by combining state information from the agents in the group. In particular, agent-group state $\sigma_G$ may be defined as $$\sigma_G = \{\Omega_G, f(\Omega_G)\},$$

where $\Omega_G$ is the set of agent states for all of the agents in the group:

$$\Omega_G = \bigcup_{A \in G} \sigma_A$$

and $f(\Omega_G)$ is the agent-group status, which may also be referred to as $\mu_G$. The group status $\mu_G$ may be formed as a function of the agent-group state, or as a function of the status of each agent in the group:

$$\mu_G = f(\Omega_G) = f(\mu_{A_1}, \ldots, \mu_{A_N}).$$

In general, the agents in an agent group may not all be owned by one agent-owner node 310, but any given agent-owner node may own a subset of the agents in the agent group. The subset owned by the $i^{th}$ agent-owner node may be written $\Lambda_i \cap G$, i.e., it is the set of agents that are both owned by the $i^{th}$ agent-owner node, and members of the group G. The $i^{th}$ agent-owner node may be in possession of partial agent-group state information, $\Omega_G^i$, for the group G:

$$\Omega_G^i = \bigcup_{A \in \Lambda_i \cap G} \sigma_A$$

This symbolic expression indicates that the partial agent-group state information possessed by the $i^{th}$ agent-owner node is the combination of the agent state information for all of the agents in the group G that are also owned by the $i^{th}$ agent-owner node. If the $i^{th}$ agent-owner node does not own any agents in the group G, then the partial agent-group state information possessed by the $i^{th}$ agent-owner node is empty.

Because together the agent-owner nodes 310 own all of the agents, full agent-group state information may be assembled by aggregating the partial agent-group state information possessed by the agent-owner nodes 310.

In one exemplary embodiment, this aggregation, of the partial agent-group state information to form full agent-group state information, may be performed by an entity referred to as a client-side adapter 330. The client-side adapter 330 may be a process instantiated on the reporting server 28 (FIG. 1) or on any other server in communication with the server on which the agent-owner nodes are instantiated.

To aggregate the partial agent-group state information to form full agent-group state information, the client-side adapter 330 may connect to all of the agent-owner nodes 310, and request, from each, state information for agent group G. Each agent-owner node 310 may then respond with the partial agent-group state information $\Omega_G^i$ of which it is in possession, and the client-side adapter 330 may aggregate the responses into full agent-group state information $\sigma_G$:

$$\sigma_G = \Omega_G^1 \oplus \ldots \oplus \Omega_G^P = \left\{ \Omega_G = \bigcup_{i=1}^{P} \Omega_G^i, \mu_G = f(\Omega_G) \right\}$$

The merge operation $\oplus$ combines the agent-group state information $\Omega_G^1, \Omega_G^2, \ldots, \Omega_G^P$, from each of the agent-owner nodes and also merges the status information to form group status $\mu_G$.

After aggregating the partial agent-group state information to form full agent-group state information, the client-side adapter 330 may make the full agent-group state information available to a client 350.

The process of connecting to all of the agent-owner nodes 310 may in one exemplary embodiment be mediated by a node referred to as the gateway node. In one exemplary embodiment, all nodes may be capable of acting as the gateway node. The client-side adapter 330 may first connect to the gateway node and obtain a list of all agent-owner nodes 310, and then establish a connection with each agent-owner node 310.

After connecting to each agent-owner node, the client-side adapter 330 may request partial agent-group state information from each agent-owner node by providing to the agent-owner node the agent-group identifier for which the client-side adapter 330 seeks to aggregate full agent-group state information. The connection between the client-side adapter 330 and each agent-owner node 310 may be a live TCP/IP connection in which the client-side adapter 330 subscribes to one or more information streams from each agent-owner node 310 and each agent-owner node 310 sends periodic updates. Each information stream may include, at the time the connection is first established, the partial agent-group state information for the requested agent group, and, subsequently, updates to the partial agent-group state information.

In one exemplary embodiment, when the state of any agent changes, the agent-owner node 310 which owns that agent checks whether the agent is a member of any agent group for which the agent-owner node 310 is reporting partial agent-group state information, and, if so, resends the entire updated partial agent-group state information to the client-side adapter 330, which established a connection with the agent-owner node 310 for that agent group. In another exemplary embodiment, the agent-owner node 310 may send, or need to send, an update containing only the changes, since the last update, to the agent-group state information.

The client-side adapter 330 may store agent-group state information locally in a hash table, using a hash function for which the key is the agent identification number. This hash function may in general be different from the static hash function used to assign agents to agent-owner nodes 310; indeed, the client-side adapter 330 need not be in possession of the latter hash function. If the client-side adapter 330 uses perfect hashing, then each agent identification number may correspond to a single storage area; otherwise it may correspond to a bucket in which a small number of agent states may be stored. The process of searching for state information for a given agent involves, in the latter case, evaluating the hash function to identify the bucket, and then searching the bucket for the desired agent; this process is more efficient than searching the entire storage area for the desired agent using some other search technique such as a linear search. A client-side adapter 330 maintaining agent-group state information for more than one agent group may maintain a separate hash table for each agent group.

If the live connection between the client-side adapter 330 and any agent-owner node 310 is broken, the client-side adapter 330 may first attempt to re-connect, and if it fails, it may purge from local storage all agent state information for agents owned by that agent-owner node. This may help to prevent, for example, a call being routed to an agent who was available to take calls prior to loss of the connection between the agent-owner node 310 and the client-side adapter 330, but who became unavailable after the connection was broken.

Referring to FIG. 4, in another embodiment the aggregation of agent-group state information may be performed in several steps by multiple client-side adapters, each of which receives partial agent-group state information and aggregates it to form aggregated agent-group state information. This aggregated agent-group state information may be full agent-group state information, as in the special case of the embodiment illustrated in FIG. 3, or it may be less than full agent-group state information, referred to as partially aggregated agent-group state information. Partial agent-group state information may thus be a special case of partially aggregated agent-group state information, in which no aggregation by client-side adapters has been performed. Intermediate client side adapters 430 may obtain partial agent-group state information, as shown in FIG. 4, or, more generally, they may obtain partially aggregated agent-group state information from any source including other intermediate client-side adapters 430. The intermediate client side adapters 430 may aggregate this information into partially aggregated agent-group state information, and a final client side adapter 440 may obtain and aggregate sufficient agent-group state information to form full agent-group state information.

Figure 5:
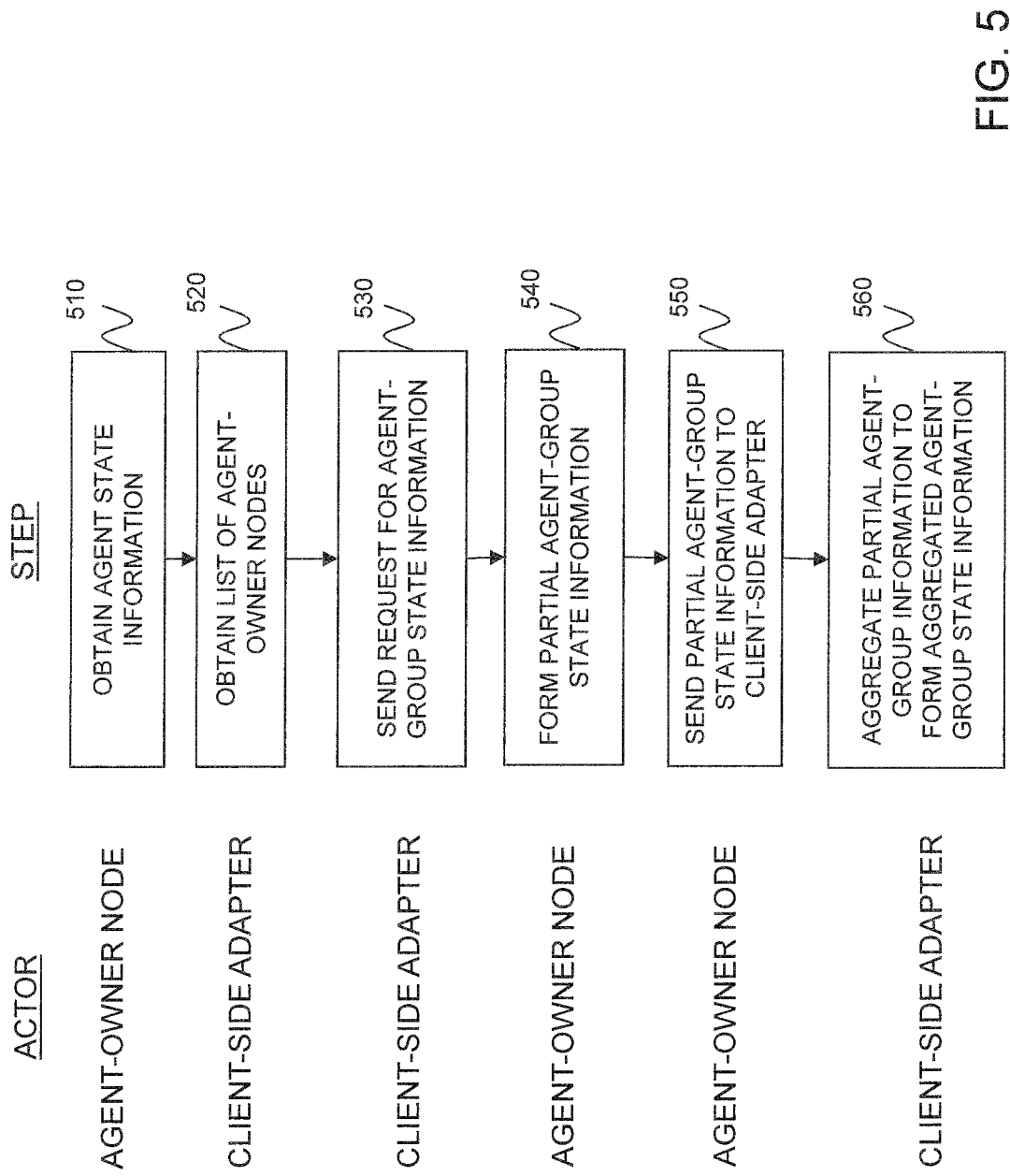
FIG. 5 is a flow chart illustrating the steps in forming full agent-group state information according to an exemplary embodiment of the present invention.

Referring to FIG. 5, the sequence of steps for aggregating full agent-group state information for an exemplary agent group may in one exemplary embodiment be summarized as follows. In a first step 510, an agent-owner node obtains agent state information for the one or more agents it owns. In a step 520, the client-side adapter obtains a list of all agent-owner nodes, for example from a gateway node. In a subsequent step 530, the client-side adapter requests from each agent-owner node the partial agent-group state information in its possession, by establishing a connection with each agent-owner node and sending to each agent-owner node a request which includes the agent-group identifier. In a step 540, each agent-owner node, in response to the request, assembles the partial agent-group state information in its possession and, in a step 550, transmits it to the client-side adapter. The client-side adapter then, in a step 560, aggregates the partial agent-group state information received from the agent-owner nodes to form aggregated agent-group state information, which may be partially aggregated agent-group state information or full agent-group state information.

Embodiments of the present invention may be seen, as follows, to be scalable. If some event happens in the system, the probability that it may affect node $N_i$ is proportional to the number of agents owned by the agent-owner node $N_i$, which is approximately equal to 1/P, where P is the number of agent-owner nodes 310 in the monitoring system. For a contact center of a given size, this probability tends to zero when $P \to \infty$.

Although exemplary embodiments of the scalable approach to agent-group state maintenance in a contact center have been specifically described and illustrated herein, many modifications and variations will be apparent to those skilled in the art. Accordingly, it is to be understood that the scalable approach to agent-group state maintenance in a contact center constructed according to principles of this invention may be embodied other than as specifically described herein. The invention is also defined in the following claims, and equivalents thereof.

What is claimed is:

1. A system, comprising:
    a first server, comprising one or more processors and a first memory, wherein the first memory stores instructions that, when executed by the first server, cause the first server to:
    instantiate a plurality of first nodes, the instantiating including associating one or more agents to each of the plurality of first nodes based on a mapping of an agent identifier of each of the one or more agents to a node identifier of the first node, wherein each of the plurality of first nodes is configured to aggregate state information for each agent associated to the first node, the state information comprising state information for one or more directory numbers to which the agent is logged;
    a second server, comprising one or more processors and a second memory, wherein the second memory stores instructions that, when executed by the second server, cause the second server to:
    instantiate an adapter coupled to a client;
    obtain partial agent-group state information from each of the plurality of first nodes;
    aggregate the partial agent-group state information to form aggregated agent-group state information; and
    output the aggregated agent-group state information to the client for routing an interaction to a particular agent;
    wherein each of the plurality of first nodes is further configured to:
    receive an agent-group identifier for the agent-group;
    determine whether each of the agents associated to the first node is a member of the agent-group; and
    send to the adapter agent-state information for each of the agents associated to the first node who is a member of the agent-group.

2. The system of claim 1, wherein the aggregated agent-group state information is full agent-group state information.

3. The system of claim 1, wherein the aggregated agent-group state information is partially aggregated agent-group state information.

4. The system of claim 1, wherein the first memory further stores instructions that, when executed by the first server, cause the first server to instantiate a plurality of second nodes configured:
    to obtain agent state information from one or more data sources or from one or more other second nodes, and to communicate agent state information to one or more first nodes of the plurality of first nodes.

5. The system of claim 1, wherein the plurality of first nodes are configured to be associated with mutually exclusive sets of agents.

6. The system of claim 1, wherein the first server and the second server are not the same server.

7. The system of claim 6, wherein the first server and the second server are configured to enable communication between the adapter and the plurality of first nodes over a Transmission Control Protocol and Internet Protocol (TCP/IP) connection.

8. The system of claim 1, wherein each of the plurality of first nodes is configured:

to determine whether the agent associated with the first node is in a list of agents defining an actual agent group when the agent group is the actual agent group, and to evaluate a predicate expression corresponding to a virtual agent group with a set of characteristics for the agent associated with the first node when the agent group is the virtual agent group, in order to determine whether each agent associated to the first node is a member of the agent group.

9. The system of claim 8, wherein the predicate expression is configured to accept a set of skill level ratings corresponding to an agent's skills, and to return a value of true or false.

10. The system of claim 1, wherein the adapter is configured to request a connection with each of the plurality of first nodes and each of the plurality of first nodes is configured to establish a connection with the adapter.

11. The system of claim 10, wherein the adapter is configured to purge agent state information for each agent associated to the first node when the connection between the first node and the adapter is broken.

12. A method, comprising:
instantiating, by a first server, a plurality of first nodes, the instantiating including associating one or more agents to each of the plurality of first nodes based on a mapping of an agent identifier of each of the one or more agents to a node identifier of the first node;
receiving, by each of the plurality of first nodes, agent state information from a plurality of data sources, the state information comprising state information for one or more directory numbers to which the agent is logged;
aggregating, by each of the plurality of first nodes, the received agent state information into full agent state information;
combining, by each of the plurality of first nodes, of the full agent state information corresponding to each of one or more agents in an agent group into partial agent-group state information;
instantiating, by a second server, an adapter coupled to a client;
establishing, by the adapter, a connection with each of the plurality of first nodes;
requesting, by the adapter, from each of the plurality of first nodes, the partial agent-group state information;
providing, by each of the plurality of first nodes, to the adapter, the partial agent-group state information, wherein the providing by the plurality of first nodes, to the adapter, of the partial agent-group state information comprises:
determining, for each agent associated to each of the plurality of first nodes, whether the agent is a member of the agent group; and
including, in response to determining that the agent is a member of the agent group, agent state information, for the agent, in the partial agent-group state information;
receiving, by the adapter, the partial agent-group state information from each of the plurality of first nodes; and
aggregating, by the adapter, the partial agent-group state information into aggregated agent-group state information; and
outputting, by the adapter, the aggregated agent-group state information to the client for routing an interaction to a particular agent.

13. The method of claim 12, wherein the aggregated agent-group state information is full agent-group state information.

14. The method of claim 12, wherein the aggregated agent-group state information is partially aggregated agent-group state information.

15. The method of claim 12, wherein the first server and the second server are not the same server.

16. The method of claim 12, wherein the associating of the one or more agents to each of the first nodes comprises associating a particular one of the one or more agents exclusively to one of the first nodes.

17. The method of claim 12, further comprising,
establishing, by the adapter, a connection with each of the plurality of first nodes;
requesting, by the adapter, from each of the plurality of first nodes, the partial agent-group state information; and
providing, by each of the plurality of first nodes, to the adapter, the partial agent-group state information.

18. The system of claim 1, wherein the mapping is a static hash function.

19. A system, comprising:
a first server, comprising one or more processors and a first memory, wherein the first memory stores instructions that, when executed by the first server, cause the first server to instantiate:
a plurality of agent-owner nodes, each agent-owner node of the plurality of agent-owner nodes being configured to own one or more agents; and
to maintain state information for each agent owned by the agent-owner node; and
a second server, comprising one or more processors and a second memory, wherein the second memory stores instructions that, when executed by the second server, cause the second server to instantiate:
a client-side adapter, configured to obtain partial agent-group state information from each agent-owner node of the plurality of agent-owner nodes; and
to aggregate the partial agent-group state information to form aggregated agent-group state information;
wherein, each agent-owner node of the plurality of agent-owner nodes is configured:
to receive an agent-group identifier;
to determine whether each of the agents owned by the agent-owner node is a member of the agent group; and
to send to the client side adapter agent-state information for each of the agents owned by the agent-owner node who is a member of the agent group.

20. A method, comprising:
instantiating, by a first server, a plurality of agent-owner nodes;
receiving, by each agent-owner node, agent state information from a plurality of data sources;
aggregating, by each agent-owner node, the received agent state information into full agent state information;
combining, by each agent-owner node, of the full agent state information corresponding to each of one or more agents in an agent group into partial agent-group state information;
instantiating, by a second server, a client-side adapter;
receiving, by the client-side adapter, the partial agent-group state information from each agent-owner node;

aggregating, by the client-side adapter, the partial agent-group state information into aggregated agent-group state information;

establishing, by the client-side adapter, a live connection with each agent-owner node;

requesting, by the client-side adapter, from each agent-owner node, the partial agent-group state information; and providing, by each agent-owner node, to the client-side adapter, the partial agent-group state information by:
  determining, for each agent owned by each agent-owner node, whether the agent is a member of the agent group; and
  including, if the agent is a member of the agent group, agent state information, for the agent, in the partial agent-group state information.

* * * * *